United States Patent
Benscoter

(10) Patent No.: US 7,455,782 B2
(45) Date of Patent: Nov. 25, 2008

(54) GRIT REMOVAL SYSTEM AND METHOD FOR EMERGENCY WATER RESERVOIR

(76) Inventor: Kenneth Benscoter, 9254 1/2 Walnut St., Bellflower, CA (US) 90706

(*) Notice: Subject to any disclaimer, the term of this patent is extended or adjusted under 35 U.S.C. 154(b) by 425 days.

(21) Appl. No.: 11/388,114

(22) Filed: Mar. 24, 2006

(65) Prior Publication Data
US 2007/0221565 A1    Sep. 27, 2007

(51) Int. Cl.
*B01D 37/00* (2006.01)
(52) U.S. Cl. ............ 210/767; 210/167.12; 210/167.16; 210/172.3; 137/571
(58) Field of Classification Search ............... 137/571, 137/357; 210/167.12, 167.16, 172.3, 767
See application file for complete search history.

(56) References Cited

U.S. PATENT DOCUMENTS

| | | |
|---|---|---|
| 2,931,382 A | 4/1960 | Cirillo |
| 3,095,892 A | 7/1963 | Martin |
| 3,936,899 A | 2/1976 | Henkin et al. |
| 3,972,339 A | 8/1976 | Henkin et al. |
| 3,996,630 A * | 12/1976 | Maderna ............... 52/169.6 |
| 4,169,484 A | 10/1979 | Bonigut et al. |
| 4,248,294 A | 2/1981 | Budzynski et al. |
| 4,313,400 A | 2/1982 | Walker et al. |
| 4,332,685 A | 6/1982 | Nowlin et al. |
| 4,348,192 A | 9/1982 | Pansini |
| 4,519,418 A | 5/1985 | Fowler |
| 4,612,951 A | 9/1986 | Descogus |
| 4,686,728 A | 8/1987 | Rawlins |
| 4,700,734 A | 10/1987 | McCauley |
| 4,718,452 A | 1/1988 | Maitland |
| 4,856,578 A | 8/1989 | McCahill |
| 4,920,599 A | 5/1990 | Rief |
| 4,962,789 A | 10/1990 | Benscoter |
| 5,293,659 A | 3/1994 | Rief et al. |
| 5,317,777 A | 6/1994 | Stoltz |
| 5,349,992 A * | 9/1994 | Gallo et al. .............. 141/18 |
| 5,379,473 A | 1/1995 | Rief et al. |

(Continued)

OTHER PUBLICATIONS

Hayward Pool Products, Automatic In Ground Cleaners, Jan. 9, 2006, 5 pages.

*Primary Examiner*—Chester T. Barry
(74) *Attorney, Agent, or Firm*—Cislo & Thomas, LLP

(57) ABSTRACT

A grit removal system for a hollow, completely enclosed emergency water reservoir tank employs a mobile suction head located within the enclosed tank, a flexible suction line coupled between the mobile suction head and the tank outlet, and a particle filtration unit located externally of the tank. The tank has an inlet from a municipal water supply system and an outlet leading to a local water distribution line. The tank is pressurized and maintained at an elevated pressure of preferably sixty to one hundred twenty psi relative to atmospheric ambient pressure. When the local water distribution line is opened, the pressure differential created due to the elevated pressure within the tank drives the mobile suction head so as to move it about the interior surface of the lower portion of the tank. The pressure differential between the interior of the tank and the local water distribution line forces water up through the suction head carrying entrained grit and sand with it. The water travels from the suction head through the flexible conduit, and through a filtration unit inlet conduit to a filtration unit. The filtration unit entraps sand and other grit, but allows the filtered water to proceed from the filter for use in a local water distribution line.

20 Claims, 2 Drawing Sheets

U.S. PATENT DOCUMENTS

| | | | |
|---|---|---|---|
| 5,778,471 A * | 7/1998 | Collison | 8/158 |
| 5,893,188 A | 4/1999 | Campbell et al. | |
| 5,933,899 A | 8/1999 | Campbell et al. | |
| 5,975,133 A * | 11/1999 | Nalewajski | 137/587 |
| 6,003,184 A | 12/1999 | Campbell et al. | |
| 6,398,878 B1 | 6/2002 | Henkin et al. | |
| 6,854,148 B1 | 2/2005 | Rief et al. | |

* cited by examiner

GRIT REMOVAL SYSTEM AND METHOD FOR EMERGENCY WATER RESERVOIR

BACKGROUND OF THE INVENTION

1. Field of the Invention

The present invention is a method and apparatus for removing grit that collects in emergency water reservoir tanks.

2. Description of the Prior Art

Emergency fresh water reservoir tanks are sometimes provided in buildings and elsewhere in order to provide potable drinking water in the event of an emergency. In emergency situations that occur when natural disasters such as earthquakes, floods, hurricanes, and fires strike, the normal municipal supply of potable drinking water is cut off from the population stricken by such natural disasters at the time when potable drinking water is most needed. The same situation could well occur in the event of a terrorist attack or other emergency situation attributable to human actions.

In order to provide potable drinking water to a stranded population in such an emergency situation, emergency water reservoir tanks are sometimes installed in buildings and kept filled with potable drinking water so that a supply of drinking water is available to a localized population in the event of an emergency.

To keep the water fresh and potable, the emergency water reservoir is connected in-line between a municipal water supply line and a local water distribution line. In a residence the local water distribution line may be connected to a conventional hot water heating tank or to the building plumbing leading to toilets, shower heads and faucets. In commercial or industrial building such as factories, hospitals, and other large installations, the local water distribution line may be connected to boilers and cooling towers. One such emergency water reservoir system is described in my prior U.S. Pat. No. 4,962,789 issued Oct. 16, 1990, which is hereby incorporated by reference in its entirety.

By connecting an emergency water reservoir in-line with incoming water provided from a municipal water supply system and to an outlet to a local water distribution line servicing the building in which the emergency water tank is located, or possibly also other nearby buildings in a building complex, the water in the emergency water reservoir is continuously replenished. Fresh water is drawn continuously or intermittently through the emergency reservoir tank for normal water usage purposes.

One major problem exists, particularly in large emergency water reservoirs such as those employed in schools, hospitals, factories, and other commercial and industrial buildings and building complexes in which the water is directed to boilers and cooling tower filtration systems. Specifically, the grit and sand that is present in a municipal water supply is passed into boilers and cooling towers where it causes significant damage. Indeed, the entrainment of sand in municipal water supplies that damages boilers and cooling towers is quite prevalent in many municipalities.

The presence of grit and sand results whether or not a fresh water emergency reservoir is coupled in-line between the municipal water supply system and the local distribution line. The sand and grit in a municipal water supply system often enters the municipal water supply lines through pinholes that form in the water pipes. These pinholes are created through electrolysis. Even if the piping and pumping stations are both new, pinholes form very quickly in the piping. The suction from the pumps at the municipal water pumping stations causes sand to enter the pinholes and become entrained in the municipal water supply lines. Once this sand reaches commercial boilers or cooling tower filtration systems, it causes a blockage in valves, particularly needle valves, thereby resulting is damage to such system. As a consequence, commercial boilers and cooling towers must be repaired and maintained by frequently cleaning out accumulated sand and other grit.

SUMMARY OF THE INVENTION

The present invention is a system for removal of sand and other grit from a municipal drinking water supply that involves the use of an emergency water reservoir. At installations that are equipped with an emergency water reservoir, the reservoir tank provides a very convenient location at which grit in the municipal water supply can be removed before it reaches the local water distribution line. The procedure for cleaning an emergency water reservoir of sand and grit requires no electricity or power other than the energy that is already available from pressurization of the water in the reservoir tank. For example, in a typical emergency water reservoir tank for a large facility, such as a hospital or factory, the reservoir tank is filled with perhaps five thousand gallons of drinking water under a pressure of sixty to one hundred twenty-five pounds per square inch (psi) relative to ambient atmosphere, which is the pressure at which water is withdrawn when valves to the local water distribution line are opened.

The grit removal system of the invention employs a suction intake which is preferably a mobile suction head of the type utilized in swimming pool cleaners. Such a mobile suction head is equipped with a tractor drive system that has paddle wheels that turn to force water through a flexible hose. In a conventional swimming pool installation the surface of the pool is open to ambient atmosphere. A suction, or subatmospheric pressure is applied to the mobile cleaner head to cause it to move about the bottom of a swimming pool, thereby turning the paddle wheels to circulate water through a filter and return it to the pool. A conventional suction operated pool cleaning system of this type requires a pump powered to create the suction to draw water and entrained debris out of the pool through the flexible hole and pass it through filters to remove the debris before returning the water to the pool.

In an emergency water supply reservoir the water in the emergency reservoir is maintained at an elevated pressure, typically between sixty and one hundred twenty-five psi. This water pressure is present in the municipal water supply line to which the emergency water reservoir tanks are connected and is provided by the municipal water pumps that pump the water through the municipal water supply lines.

In one broad aspect the present invention may be considered to be a grit removal system for a hollow, completely enclosed emergency water reservoir tank maintained under elevated pressure above ambient atmospheric pressure and having a tank inlet from a municipal water supply system and a tank outlet to a local water distribution line. The grit removal system of the invention is comprised of a suction intake, a suction line, a particle filtration unit located externally of the tank, a filtration unit inlet conduit, and a filtration unit outlet conduit. The suction intake is located within the enclosed tank. The suction line is coupled between the suction intake and the tank outlet. The filtration unit inlet conduit leads from the tank outlet to the particle filtration unit. The filtration unit outlet conduit leads from the filtration unit to the local water distribution line. As a consequence, when the local water distribution line is opened, the elevated pressure within the emergency water supply tank forces water with entrained grit from within the tank into the intake and through the suction line into the filtration unit from the filtration unit inlet conduit.

This same pressure differential also results in filtered water being expelled from the filtration unit to the local water distribution line.

The grit removal system of the present invention requires no electricity nor any separate vacuum system. When the valve to the local water distribution line is opened, pressure in that line is relieved and drops to ambient pressure. The elevated pressure within the emergency water reservoir tank created in the municipal water supply system thereupon forces water into the suction intake, through the suction line, and through the filtration unit. Sand and grit, as well as other debris, is thereby carried out of the emergency water reservoir tank, filtered, and delivered with the grit removed, or at least greatly reduced, to the local water distribution line.

The grit removal system of the present invention provides a cleaning process in which the emergency water reservoir tank proves an energy efficient apparatus for cleaning municipal water of grit for factories, hospitals, and other industrial uses, as well as hospitals and schools. The extreme energy efficiency of the system can also result in tax saving benefits due to tax laws that encourage such energy efficient operations.

A further advantage of the invention is that it greatly reduces the extent of maintenance required for cleaning boilers, water towers, and other devices that are susceptible to damage by entrained grit in municipal water supplies.

The suction intake employed in the invention is preferably a mobile swimming pool cleaner suction head. The suction line is preferably a flexible suction hose of the type employed with mobile swimming pool cleaner suction heads. To ensure free mobility of the suction head, and to prevent the flexible suction hose within the emergency water reservoir tank from kinking, a swivel coupling, is preferably provided within the tank between the flexible suction hose and the tank outlet. Such a swivel connection allows free movement of the mobile suction head within the tank across the lower portion thereof. When the emergency reservoir tank is shaped generally in the form of a hollow, cylindrical structure oriented to lie on a horizontal axis, the mobile suction head will traverse across at least the lower quarter of the cross-sectional perimeter of the tank.

Shutoff valves are preferably located in each of the filtration unit inlet and filtration unit outlet lines to respectively allow isolation of the filtration unit from the tank and from the local water distribution line. Also, a pressure relief line with a relief valve therein is coupled to the filtration unit inlet line between the shutoff valve therein and the filtration unit. The shutoff isolation valves and the pressure relief valve allow depressurization of the filtration unit so that the filters can be removed from it periodically and either cleaned or replaced.

The emergency water reservoir tank is preferably equipped with a removable and sealable watertight hatch that is large enough for the suction head to pass through it. The hatch provides a convenient opening for installing the mobile suction head in the tank and for removing it, should any maintenance or repair of the mobile suction head prove necessary.

The emergency water reservoir tank is pressurized to an elevated pressure of at least sixty psi above ambient atmospheric pressure. The pressure in the tank is preferably maintained at an elevated pressure of between about sixty psi and about one hundred twenty-five psi. A pressure differential between the tank and the local water distribution line of between sixty and one hundred twenty-five psi reliably operates the mobile suction head and powers the grit removal system when the local water distribution line is opened.

A check valve is preferably provided in the filtration unit outlet conduit to prevent filtered, downstream water from flowing back into the filtration unit. This ensures that grit and sand trapped in the filtration unit remains trapped.

A branch line may be provided from the filtration unit outlet conduit between the downstream check valve in the outlet conduit and the local water distribution line. The branch line can lead back to the emergency water reservoir tank and is preferably provided with a branch check valve. The branch check valve prevents water under pressure in the emergency reservoir tank from being forced out of the tank through the branch line, thereby bypassing the filtration unit.

In another broad aspect the invention may be considered to be an improvement in an emergency water reservoir that includes a hollow, completely enclosed tank containing a supply of emergency water under pressure elevated above ambient atmospheric pressure. The tank has an inlet connected to a water supply system and a tank outlet for discharging water for use downstream therefrom through a local water supply line. According to the improvement of the invention, a suction operated grit filtration system is provided including a suction intake that is located within the enclosed tank in the bottom portion thereof. A suction hose is connected between the suction intake and the tank outlet. A filtration unit for filtering and entrapping grit from the flow of water therethrough is also provided. A filtration inlet conduit is coupled between the tank outlet and the filtration unit. A filtration outlet conduit is coupled between the filtration unit and the local water supply line. Pressure within the tank forces water containing grit that has settled into the bottom portion of the tank into the suction intake. This pressure causes water to flow through the suction hose and into the filtration unit and to force filtered water from the filtration unit into the filtration outlet conduit and from there to the local water supply line.

In still another broad aspect the invention may be considered to be a method of removing grit from a hollow, completely enclosed emergency water reservoir tank filled with water from a water supply system. The water reservoir tank has a bottom portion and a tank inlet coupled to the water supply system and a tank outlet to a local water distribution line. According to the method of the invention a suction intake is provided inside of the hollow tank in the bottom portion thereof. A suction line is also located inside the hollow tank and is coupled between the suction intake and the tank outlet. A water filtration unit is provided externally of the hollow tank. The water filtration unit is coupled to both the tank outlet and a local water distribution line. Pressure is elevated within the water reservoir tank above pressure in the local water distribution line when the local water distribution line is opened to discharge water. Consequently, pressure in the tank forces water and entrained grit from the bottom portion of the tank, through the suction intake, and into the filtration unit. The same pressure expels the water from the filtration unit to the local water distribution line while entrapping the grit within the filtration unit.

The invention may be described with greater clarity and particularity by reference to the accompanying drawings.

DESCRIPTION OF THE EMBODIMENT

Figure 1:
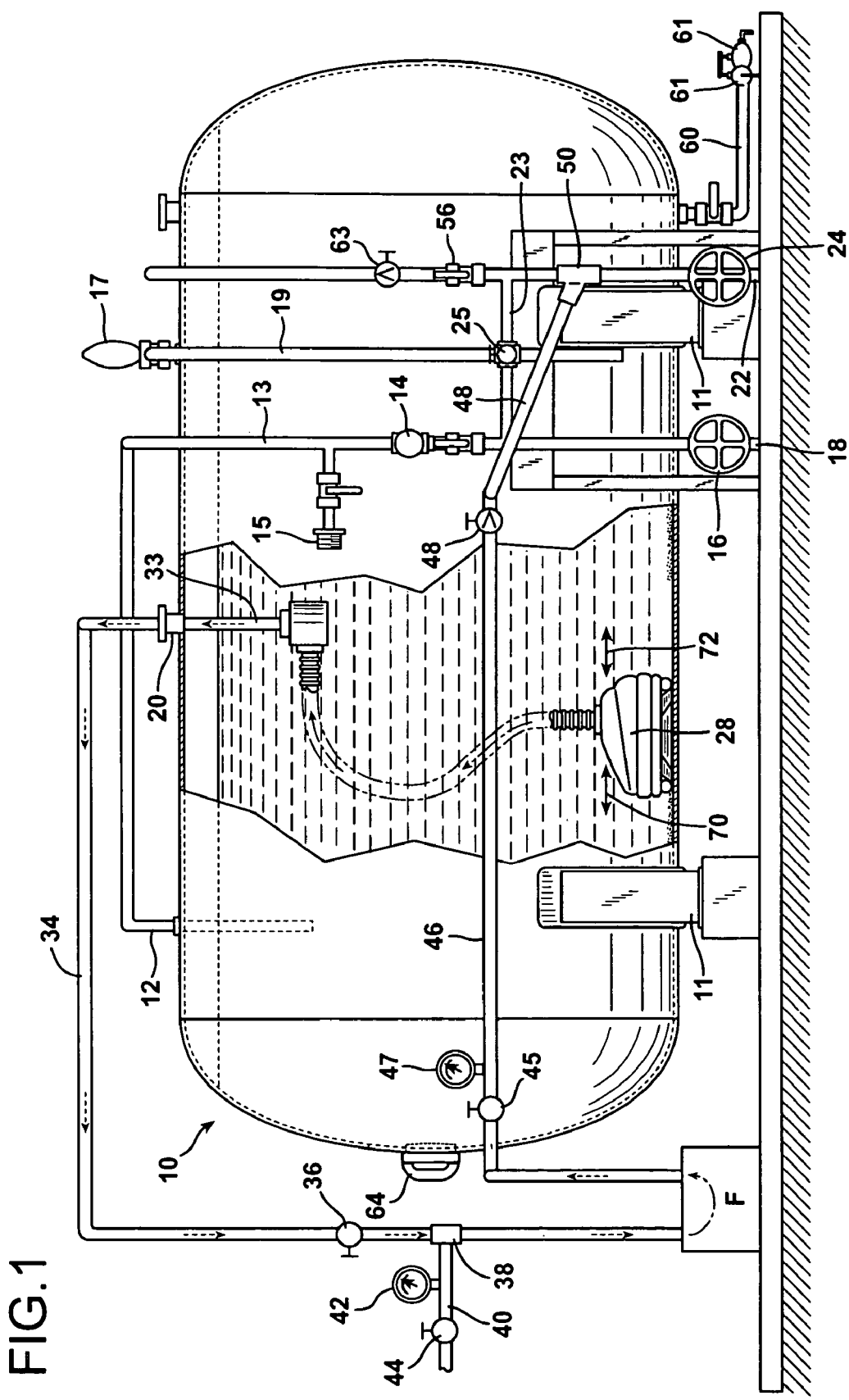
FIG. 1 is a side elevational view, partially broken away, of an emergency water reservoir tank equipped with a grit removal system according to the invention.

FIG. 1 illustrates an elongated emergency water reservoir tank 10 which is generally cylindrical throughout most of its length, but which has rounded ends. The tank 10 may have an overall length of one hundred eighty-three inches and an overall diameter of 87.96 inches. The tank 10 may be formed of FAS16-70 steel having a nominal wall thickness of one inch. A tank 10 constructed in this size has a volume of five thousand gallons.

The tank 10 has a tank inlet 12 coupled with suitable piping through a gate valve 14 and a wheel valve 16 to a municipal water supply system through line 18. As with all pressurized tanks, the tank 10 is required by law to have a pressure safety relief valve 17 that is connected to an overflow pipe 19.

The reservoir tank 10 also has a tank outlet 20 that ultimately leads to a local water distribution line 22. A handwheel gate valve 24 is provided to isolate the emergency water storage reservoir system from the local water distribution line 22.

In a large system such as that shown the local water distribution line 22 is typically connected to a boiler which has its own valving system to open the local water distribution line 22 intermittently as water is required for the boiler. When the local water distribution line 22 is opened, pressure in it drops to ambient atmospheric pressure.

A bypass line 23 is connected between the line 18 from the municipal water supply and the local water distribution line 22. The bypass line 23 provides a flow path between the municipal water supply line 18 and the local water distribution line 22 to provide for a continuous water supply if it is necessary to take the emergency water reservoir tank 10 out of service. A valve 25 in the bypass line 23 is provided and is closed as long as the tank 10 is in service.

A mobile swimming pool cleaner suction head 28 is provided within the hollow cavity of the emergency water reservoir tank 10. Also, a flexible suction hose 30 is provided and is coupled between the mobile suction head 28 and the tank outlet 20 through a swivel coupling 32. The swivel coupling 32 is sealed with a pressure-tight sliding seal that allows the swivel coupling 32 to turn in rotation about a fixed pipe 33 that is connected to the tank outlet 20. The swivel coupling 32 is provided to avoid kinking of the flexible coupling line 30 as the mobile suction head 28 moves about within the tank 10. The pressure differential between pressure within the tank 10 and the open local water distribution line 22 powers the suction head 28 to move it about the tank 10

The mobile suction head 28 may be a conventional swimming pool cleaner head such as the Navigator Model 925C or Navigator Model 925V swimming pool cleaner suction heads sold by Hayward Pool Products, Inc. Those models and other swimming pool cleaner suction systems can be found at www.haywardnet.com.

A particle filtration unit F is provided externally of the emergency water reservoir tank 10. The filtration unit F contains one or more mesh filters of the type suitable for filtering sand from drinking water. A filtration unit inlet conduit 34 leads from the tank outlet 20 to the particle filtration unit F. A manually operated shutoff ball valve 36 is provided in the filtration unit inlet line 34. A T-connection 38 is provided in the filtration unit inlet line 34 and provides a path of fluid flow to a pressure release line 40 having a pressure gauge 42 and a pressure relief valve 44 located therein. The pressure relief line 40 is coupled to the filtration unit inlet line 34 between the shutoff ball valve 36 and the filtration unit F.

A filtration unit outlet line 46 leads from the filtration unit F to the local water distribution line 22. A manually operated shutoff ball valve 45 is provided in the filtration unit outlet line 46. A large pressure differential in pressure readings between the pressure gauges 42 and 47 when the local water distribution line is open indicated that the filters in the filter unit F are clogged and should be cleaned or replaced.

Downstream from the gauge 47 a check valve 48 is located in the filtration unit outlet line 46 to prevent water from flowing back toward the filtration unit F once it has passed through the filtration unit F. The filtration unit outlet line 40 includes a section 48 that is inclined downwardly and which leads to a T-connection 50. One leg of the T-connection 50 is coupled to the local water distribution line 22. The other leg of the T-connection 50 is connected to a branch line 54 that leads back to the emergency water reservoir tank through a gate valve 56. A branch check valve 63 is located in the branch line 54 to prevent water under pressure from being forced out of the tank 10 through the branch line 54 and directly to the local water distribution line 22. Such a flow would bypass the filtration unit F.

The tank 10 is also provided with a manifold withdrawal line 60 with a faucet 61 from which water can be withdrawn for emergency purposes. However, under conditions other than emergency conditions water is withdrawn from the tank 10 through the local water distribution line 22, since filtered water normally flows through that line.

The tank 10 is equipped with a removable and resealable hatch 62 at one end. The hatch 62 is fastened fluid-tight into an elliptical-shaped opening in the end of the tank 10. A conventional twistable lock 64 may be rotated to engage lugs to create a liquid-tight seal between the hatch 62 and the hatch opening at the end of the tank 10. The hatch 62 and the opening into which it fits are large enough for the suction head 28 to be placed into or removed from the emergency water reservoir tank 10.

Water pressure within the tank 10 is maintained at a elevated level above ambient atmospheric lever, preferably at a pressure of between sixty and about one hundred twenty-five psi. Consequently, the pressure within the tank 10 exceeds the pressure in the local water distribution line 22 whenever water is flowing out of the local water distribution line 22, for use either as drinking water, or for supplying a boiler or cooling tower with water.

Figure 2:
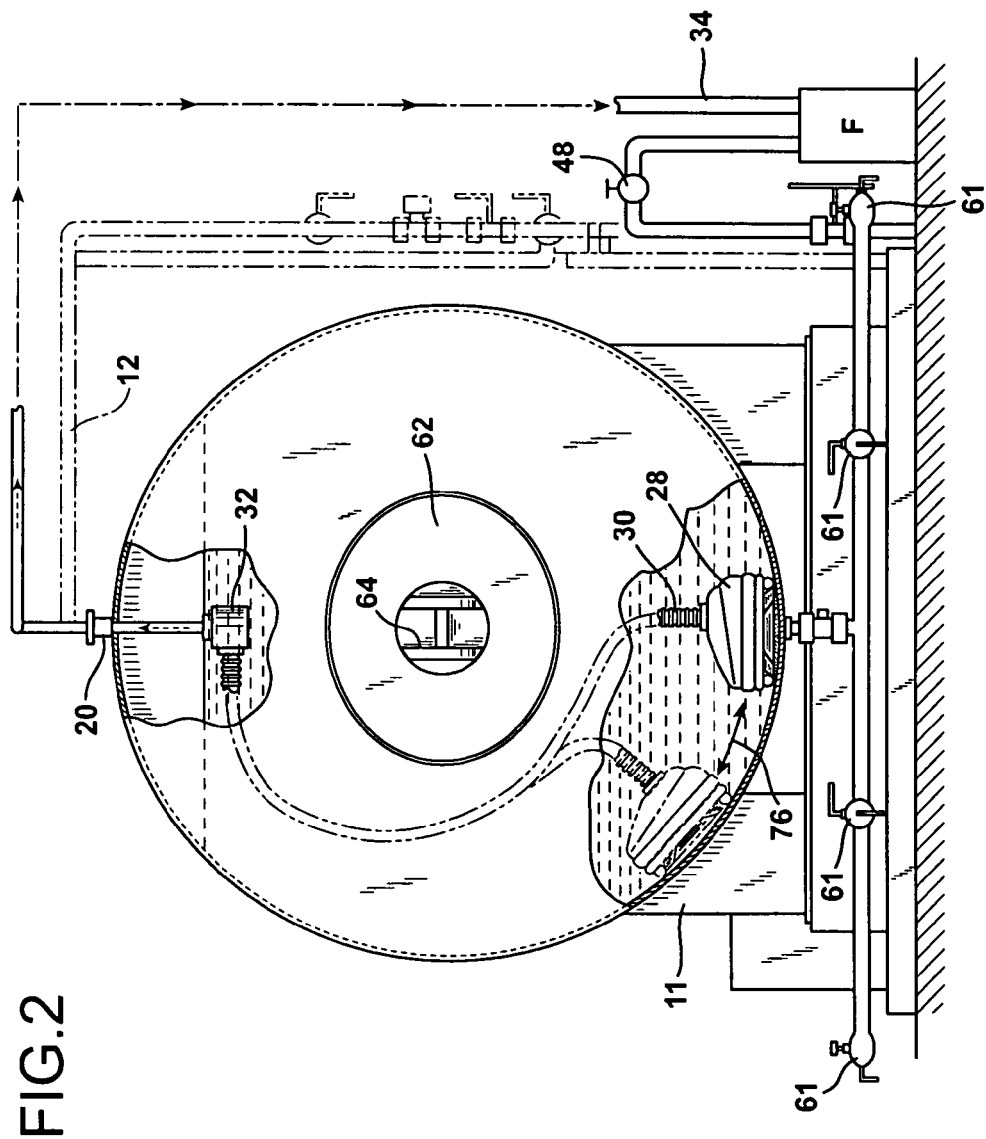
FIG. 2 is a left side elevational view, also partially broken away, of the emergency water reservoir tank of FIG. 1.

Typically the local water distribution line 22 will be opened and closed intermittently to draw water from the municipal water supply inlet line 18. When water is drawn off through the local water distribution line 22, replenishing water flows into the tank 10 from the municipal water supply line 18, the valve 14, and the tank inlet 12. Because an elevated pressure exists within the tank 10, opening of the local water distribution line 22 to ambient pressure causes water to flow from within the tank 10 into an impeller in the swimming pool cleaning head 28, thereby propelling the swimming pool cleaning head 28 across the bottom of the tank 10, as indicated by the directional arrows 70 and 72. With a tank 10 having the configuration described, the cleaning head 28 will be driven by the pressure differential, both fore and aft, along the bottom of the tank 10, as indicated by the direction arrows 70 and 72 of FIG. 1, and also partially up the side walls of the tank 10, as indicated in phantom at 74 and by the directional arrows 76, as illustrated in FIG. 2. The cleaning head 28 can be driven along the lower quarter of the interior surface area of the tank 10, as indicated in FIG. 2.

Paddles within the mobile suction head 28 propel the cleaning head 28 so as to move it along the bottom across the interior of the water reservoir tank 10. The flow of water also drives the paddles within the cleaning head 28 to force water from the bottom of the tank 10 up through the flexible suction line 30. That is, the paddles within the cleaning head 28 serve as an impeller to pump water into the flexible hose 30. The swivel coupling 32 ensures that the flexible suction hose 30 does not become kinked as the mobile suction head 28 traverses about within the confines of the water reservoir tank 10.

From the swivel coupling 32 water containing entrained grit therein is forced upwardly from the bottom of the tank 10 and through the filtration unit inlet conduit 34 and into the filtration unit F. The filtration unit F contains mesh filters that entrap sand and other grit and debris within the filter unit F. The filtered water then flows from the filtration unit F out through the filtration unit outlet conduit 46 and ultimately to the local water distribution line 22. The check valve 48 ensures that flow in the filtration unit outlet conduit 46 will only travel from the filtration unit F to the local water distribution line 22, and not in the opposite direction. The filtered water emanating from the local water distribution line 22 is largely free from grit so that it can be safely used in boilers and cooling towers without danger of building up scale or clogging valves employed in such devices.

Because sand and grit is heavier than water, it will drift to the bottom of the tank 10 when the local water distribution line 22 is closed. As water flows through the emergency water reservoir tank 10 and is forced by the mobile suction head 28 out of the tank 10 and through the filtration unit F, it carries with it sand and other grit and any miscellaneous debris that may have been entrained in the water from the municipal water source and that was collected at the bottom of the tank 10. From there it is entrained in the flow of water that passes out of the tank 10, but is removed in the filtration unit F before it reaches the local water distribution line 22. The system of the invention thereby provides a simple, cost effective way of removing sand and other grit so commonly found in municipal water supply systems before it reaches boiler valves or other ducts or valve mechanisms that can be clogged by particulate matter.

A further advantage of the invention is that by removing grit and particulate matter before it ever reaches a boiler or cooling tower, a build up of scale on the inside surface of a boiler or cooling tower is avoided or greatly reduced. Consequently, the heating costs for heating water in a boiler are reduced since the insulating effects of scale on the inside surface of a boiler are avoided. Likewise, the elimination or great reduction of scale on the inside of a cooling tower improves the rate of thermal transfer, thereby improving the energy efficiency of the cooling tower.

Undoubtedly, numerous variations and modifications of the invention are possible. For example, the suction intake could be a fixed duct opening at the bottom of the tank 10 and the suction line 30 could be a rigid pipe leading to it. Also, other types of pressure operated mobile suction heads such as marine vessel hull scrubbers and the like can be substituted for the swimming pool suction head 28 employed in the embodiment of the invention illustrated. Accordingly, the scope of the application should not be limited to the specific embodiment of the apparatus or implementation of the method described, but rather is defined in the claims appended hereto.

I claim:

1. A grit removal system for a hollow, completely enclosed emergency water reservoir tank having a bottom portion and maintained under elevated pressure above ambient atmospheric pressure and having a tank inlet from a municipal water supply system and a tank outlet to a local water distribution line comprising:

a suction intake located in said bottom portion of said enclosed tank,
   a suction line coupled between said suction intake and said tank outlet,
   a particle filtration unit located externally of said tank, a filtration unit inlet conduit leading from said tank outlet to said particle filtration unit, a filtration unit outlet conduit leading from said filtration unit to said local water distribution line, whereby said elevated pressure within said tank causes said suction intake to suck in water with entrained grit from within said tank and force said water and grit into said filtration unit from said filtration unit inlet conduit and expel water from said filtration unit to said local water distribution line.

2. A grit removal system according to claim 1 wherein said suction intake is a mobile swimming pool cleaner suction head, said suction line is a flexible suction hose, and said elevated pressure within said tank also propels said swimming pool cleaner head about said bottom portion of said tank.

3. A grit removal system according to claim 2 further comprising a swivel coupling within said tank between said flexible suction hose and said tank outlet to avoid kinking of said flexible suction hose as said mobile suction head moves about within said tank.

4. A grit removal system according to claim 2 wherein said tank is equipped with a removable and sealable watertight hatch large enough for said mobile suction head to pass therethrough.

5. A grit removal system according to claim 4 further comprising a swivel coupling located within said tank and connected to said flexible suction hose and to said tank outlet.

6. A grit removal system according to claim 1 further comprising shutoff valves located in each of said filtration unit inlet and filtration unit outlet lines to respectively selectively isolate said filtration unit from said tank and from said local water distribution line, and a pressure relief line with a relief valve therein coupled to said filtration unit inlet line between said shutoff valve therein and said filtration unit to depressurize said filtration unit.

7. A grit removal system according to claim 1 wherein said tank is pressurized to an elevated pressure of at least sixty psi above ambient atmospheric pressure.

8. A grit removal system according to claim 7 wherein said tank is maintained at an elevated pressure of between about sixty psi and about one hundred twenty-five psi.

9. A grit removal system according to claim 1 wherein a check valve is provided in said filtration unit outlet conduit to prevent water flow in said filtration unit outlet conduit toward said filtration unit.

10. A grit removal system according to claim 9 further comprising a branch line from said filtration unit outlet conduit between said check valve and said local water distribution line, and said branch line leads back to said emergency water reservoir tank, and further comprising a branch check valve in said branch line to prevent flow of water out of said tank through said branch line.

11. In an emergency water reservoir including a hollow, completely enclosed tank having a bottom portion and containing a supply of emergency water under pressure elevated above ambient atmospheric pressure and having a tank inlet connected to a water supply system and a tank outlet for dispensing water for use downstream therefrom through a local water supply line, the improvement comprising a suction operated grit filtration system including a suction intake located within said enclosed tank in said bottom portion thereof, a suction hose connected between said suction intake and said tank outlet, a filtration unit for filtering and entrapping grit from a flow of water therethrough, a filtration inlet conduit coupled between said tank outlet and said filtration unit, a filtration outlet conduit coupled between said filtration unit and said local water supply line, whereby, pressure within said tank forces water and grit that has settled to said bottom portion of said tank into said suction intake and to flow through said suction hose and to force filtered water from said filtration unit into said filtration outlet conduit and from there to said local water supply line.

12. A grit filtration system according to claim 11 further comprising a check valve in said filtration outlet conduit thereby ensuring that water only flows from said filtration outlet conduit in a direction away from said filtration unit.

13. A grit filtration system according to claim 12 further comprising a branch line from between said check valve and said building water supply line, whereby said branch line empties back into said enclosed tank, and a branch check valve in aid branch line to prevent flow of said water out of said tank through said branch line.

14. A grit filtration system according to claim 11 wherein said tank is pressurized to a pressure of at least about sixty psi and no greater than about one hundred sixty-five psi.

15. A grit filtration system according to claim 11 wherein said tank is pressurized to a pressure of between about sixty psi and about one hundred twenty-five psi.

16. A grit filtration system according to claim 11 wherein said suction intake is a mobile suction operated swimming pool cleaner head, and said suction hose is flexible whereby said pressure within said tank also moves said mobile swimming pool cleaner head across said bottom portion of said tank.

17. A method of removing grit from a hollow, completely enclosed emergency water reservoir tank filled with water from a water supply system and having a bottom portion and a tank inlet coupled to said water supply system and a tank outlet to a local water distribution line comprising:

provide a suction intake inside of said hollow tank in said bottom portion thereof and a suction line also inside of said hollow tank coupled between said suction intake and said tank outlet, providing a water filtration unit externally of said hollow tank, coupling said water filtration unit to both said tank outlet and said local water distribution line, and elevating pressure within said water reservoir tank above pressure in said local water distribution line, whereby pressure in said tank forces water and entrained grit from said bottom portion of said tank through said suction intake and into said filtration unit, and to expel said water from said filtration unit to said local water distribution line while entrapping said grit within said filtration unit when said local water distribution line is opened.

18. A method according to claim 17 further comprising pressurizing said water reservoir tank to a pressure of between about sixty and about one hundred twenty psi above pressure in said local water distribution line.

19. A method according to claim 17 wherein said suction intake is a mobile swimming pool cleaner head, and said suction line is a flexible suction line and further comprising propelling said mobile swimming pool cleaner head across said bottom portion of said tank.

20. A method according to claim 17 further comprising withdrawing water from said local water distribution line only intermittently, whereby pressure in said water reservoir tank is elevated above pressure in said local water distribution line only intermittently.

* * * * *